(12) United States Patent
Zivic

(10) Patent No.: US 6,328,176 B1
(45) Date of Patent: Dec. 11, 2001

(54) MULTIFUNCTIONAL PROTECTIVE COMPONENT

(75) Inventor: Zoran Zivic, Medvode (SI)

(73) Assignee: Keko-Varicon, Zuzemberk (SI)

( * ) Notice: Subject to any disclaimer, the term of this patent is extended or adjusted under 35 U.S.C. 154(b) by 0 days.

(21) Appl. No.: 09/101,521

(22) PCT Filed: Nov. 10, 1997

(86) PCT No.: PCT/SI97/00030

§ 371 Date: Nov. 12, 1998

§ 102(e) Date: Nov. 12, 1998

(87) PCT Pub. No.: WO98/21731

PCT Pub. Date: May 22, 1998

(30) Foreign Application Priority Data

Nov. 11, 1996 (SI) ..................................... 9600330

(51) Int. Cl.⁷ ..................................... H01L 23/62
(52) U.S. Cl. ..................... 215/355; 257/355; 257/173; 338/49; 338/66; 338/21
(58) Field of Search ................... 257/355, 173; 338/49, 66, 21; 215/355

(56) References Cited

U.S. PATENT DOCUMENTS 5,714,802 * 2/1998 Cloud et al. ................... 257/726

* cited by examiner

Primary Examiner—Fetsum Abraham
(74) Attorney, Agent, or Firm—Timthoy J. Ziolkowski; Cook & Franks S.C.

(57) ABSTRACT

Subject of the present invention is multifunctional protective component. This new component provides simultaneous protection against voltage strokes and against both high and low frequency disturbances. It is composed of two discrete chip components, namely of multilayer ZnO polycrystalline diode and multilayer ceramic condenser or multilayer self-limiting condenser and multilayer ceramic condenser, which are mutually mechanically connected with non-conductive low-temperature glass (frite), parallel electrical connection between both chips being created with second metallization, and common outer electrodes of newly formed chip. This new component is suitable for surface mounting as well as in terminal leads form.

11 Claims, 1 Drawing Sheet

MULTIFUNCTIONAL PROTECTIVE COMPONENT

FIELD OF INVENTION

Figure 1:
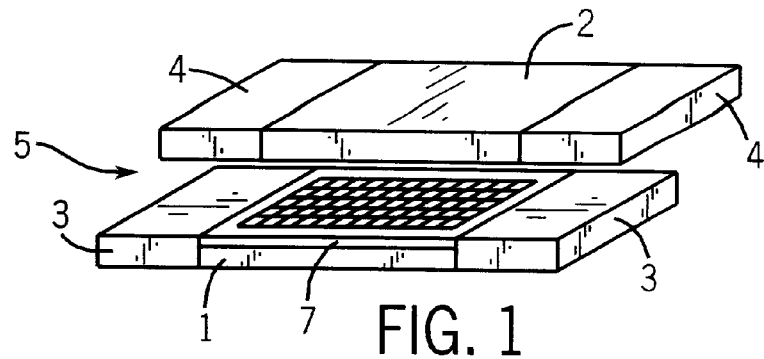

Subject of the present invention belongs to the field of protective electronic elements, used in safeguarding of other electronic elements and devices against voltage and current strokes, and against high and low-frequency disturbances.

TECHNICAL PROBLEM

Miniaturisation and increase of complexity of contemporary electronic elements and systems, as well as their increasingly wider application simultaneously increase their sensitivity to electronic discharge (ESD), voltage excess and strokes and frequency disturbances. These phenomena may disable normal functioning of separate components, decrease their stability and reliability and may even destroy them. In this way above phenomena jeopardise normal functioning of very complex and expensive electronic systems Sources of these phenomena may be various. For instance the largest source of electrostatic discharge is man itself in the process of manipulation with electronic devices. Most typical source of voltage strokes is lightning, which induces charge in electrical and telecommunication lines, this charge being transferred through the lines to electronic elements. And some of electronic elements themselves (e.g. electromotor, relay) induce disturbances of various frequencies and emit them in their closest surrounding. Thus each separate electronic component and its part shall be protected with special components that provide such protection. On the other hand this means that disturbance emission shall be prevented at the source.

Only use of components, with following properties may provide protection against ESD and voltage strokes: non-linear I-U characteristic, short response time and ability to absorb larger amounts of energy. Such characteristics are available in some elements, like Zener diode, multilayer ZnO polycrystalline diode (Varicon), varistor, and condensers with varistor characteristic or self-limited breakthrough.

The simplest elements for protection against frequency disturbances are condensers with capacitance up to do 100 nF for high frequencies and in case of lower or radio frequencies with capacitance up to 2000 nF.

Consequently it is clear that in order to protect against all mentioned undesired phenomena, such protective component shall have all required properties: non-linear I-U characteristic, short response time, ability to absorb larger amount of energy, and adjustable capacitance in range from 10 to 2000 nF. Beside that it must be smaller than any existing solutions and shall offer surface mounting option with terminal leads.

Subject of this invention, multifunctional component has exactly such properties.

STATE OF ART

Beside the most expensive solution, namely use of two discrete elements in parallel electrical connection e.g. combinations Zener diode—condenser or varistor-condenser, there are some other contemporary solutions one of which is condenser with varistor properties as described in European Patent 418394A. Mentioned condenser is based on $SrTiO_3$, which provides high value of dielectric constant ($\epsilon > 20000$). Multilayer manufacturing technology provides wide scope of capacitance (10–2000 nF) at relatively small dimensions. However its worst side is, bad varistor characteristic and low value of non-linearity coefficient, soft knee and also high leakage current, high value of breakthrough voltage temperature coefficient and very narrow range of operating voltage. Further more materials for manufacturing such elements and production technology are very expensive. In U.S. Pat. No. 5,146,200 hybrid bond between multilayer chip varistor and multilayer chip condenser is disclosed. Physical bond of these two elements is achieved with gluing and parallel electrical connection is achieved with soldering.

Components as self-limiting multilayer condenser as shown in U.S. Pat. No. 4,729,058 and multilayer ZnO polycrystalline diode (Varicon diode) have very non-linear I-U characteristic and high self capacitance, which may within real dimensions reach up to 100 nF. In that way these two mentioned components provide protection against ESD and voltage strokes and effectively filter high frequency disturbances, but not low frequency disturbances.

DESCRIPTION OF INVENTION

New multifunctional component is based on the following facts:

- self-limiting multilayer condenser and Varicon diode have such properties, which provide effective protection against ESD and voltage strokes in voltage range from 4 to 150 V
- contemporary commercially available chip condensers have very high capacitance while dimensions are small
- both components have similar shape and similar dimensions.

Present invention proves that low temperature scorching provides possibility to create monolith element from two discrete elements, this newly created element preserving all unchanged functions of both discrete elements, which are mutually electrically parallel connected in new element.

As mentioned above, two discrete components are used to produce this new component. One of them must provide good ESD protection and good protection against voltage strokes. To meet these demands self-limiting condenser or Varicon diode may be used, both have excellent properties of protective component.

Second component only completes already high self capacitance of Varicon diode or self-limiting condenser up to preferred value, which is necessary for successful protection against high or low frequency disturbances. For this purposes use of multilayer ceramic condenser is preferred. Ceramic condenser provides desired capacitance, even up to 2000 nF and is manufactured in similar shapes and dimensions as Varicon diode or self-limiting condenser. Both elements to bond shall have equal planar dimensions (wideness and length) and their largest sides must be even.

Figure 2:
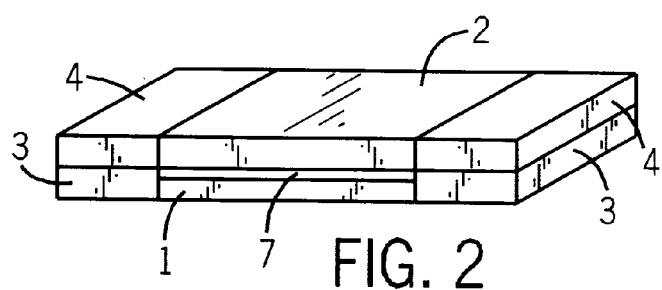

FIG. 1 shows Varicon diode chip (1) and condenser chip (2), each separately. As shown in FIG. 1, both components have same shape, equal planar dimensions, and on their shortest sides outer silver electrodes (3) and (4), which are already formed to allow electrical checking of both discrete components. Physical bond between two chips is made in such manner, that thin layer of suspension (7) is brought on only one of two largest area of Varicon diode or condenser, in such way to cover whole area of the chip between two electrodes (5). Suspension is composed from dust of low temperature high resistant glass (frite), with temperature of glassification between 500° and 800° C., binder and solvent, which allow glass (frite) as a glass paste, to be placed to the chip surface with printing, brush or in some other manner. Thickness of the suspension layer (7) brought to the chip surface is between 10 μm and 500 μm. Immediately after suspension is placed, second unplastered chip is placed with its larger side on the plastered side of the first chip in such manner that all edges are even, and their outer electrodes (3) and (4) fall in, and lay one upon another on both sides of the chips, as shown in FIG. 2. Both chips with glass inter layer (7) form sandwich structure. So placed chips are then scorched at temperature between temperature high resistant glass (frite), with temperature of glassification between 500° and 800° C. Binder and solvent evaporate at lower temperatures so only glass remains between chips (1) in (2). At certain temperature glass liquefies and diffuses in bodies of both components. Depth of diffusion may be controlled via glassification parameters (time and temperature) to ensure that glass will not diffuse to inner electrodes depth. In certain temperature range glass turns into thin amorphous layer with good mechanical, heat and insulating properties, after cooling. Glass layer (7) is very good bound with both chips, due diffusion into both chip bodies. In that way, with glass layer (7) very good mechanical bond between both elements is achieved, and the surface between both elements has no porosity. Therefore we may say, that with glass, one monolith element composed of two discrete elements is created from two discrete elements.

Figure 3:
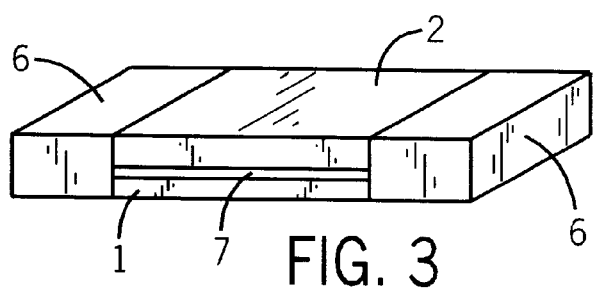
Figure 4:
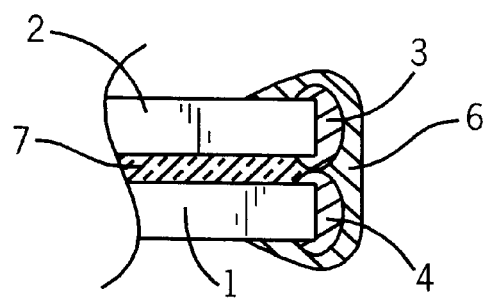

Regardless of the fact that outer electrodes of both chips are in physical contact, we may still not claim that reliable electric connection between them is achieved. Therefore so formed composition—monolith is repeatedly metallised with Ag or AgPd paste in such manner, that both smaller sides are plunged to certain depth into Ag or AgPd paste, and uninterrupted outer electrodes (6) of new component are created, both being at the same time in contact with both outer electrodes of both chips on the inner side. After this paste is scorched at the temperature from 550° to 850° C., reliable electric contact, and parallel electrical connection between Varicon diode and ceramic condenser, as readily shown in FIGS. 3 and 4.

When AgPd is used as second electrode paste, new chip (e.g. protective multifunctional protective component) is suitable for surface mounting.

If component with terminal leads is desired, second metallisation will be performed with Ag paste. So achieved component is placed between terminal leads, which will be finally metallurgical and electrical connected with outer electrodes in soldering process. Additional moulding into epoxy resins provides standard shapes of components with terminal leads.

EXAMPLE

Using self-limiting condensers and Varicon diodes on one side and multilayer condenser on other side, varieties of multifunction protective components were made, using above described technique. Some of results are shown in table 1.

TABLE 1

| Chip dimensions (mm) | Un (V) | α 1–10 mA | $I_{max}$ (8/20 μs) (A) | C (1 kHz) (nF) |
|---|---|---|---|---|
|  | 4 | 32 | 50 | 33 |
| 15 | 29 | 100 | 33 |  |
| 3.2 × 2.5 | 22 | 28 | 250 | 47 |
|  | 27 | 28 | 500 | 1000 |
|  | 27 | 27 | 1000 | 680 |

TABLE 1-continued

| Chip dimensions (mm) | Un (V) | α 1–10 mA | $I_{max}$ (8/20 μs) (A) | C (1 kHz) (nF) |
|---|---|---|---|---|
|  | 33 | 35 | 2000 | 470 |
| 5.7 × 5.0 | 33 | 35 | 2000 | 1500 |

Un—breakdown voltage 1 mA
α—non-linearity coefficient
$I_{max}$—Higher impulse current, without consequences for component
C—capacitance measured at value of 1 kHz

What is claimed is:

1. A multifunctional protective component to provide protection against current, voltage, and frequency irregularities comprising:
   a first chip comprising a multiplayer ceramic condenser chip having a first end and a second end, each end having an outer electrode attached thereto;
   a second chip comprising one of a self-limiting condenser and a Varicon diode, the second chip having a first end and a second end, each end having an outer electrode attached thereto;
   a layer of glass suspension material disposed between the first and second chips; and
   a pair of uninterrupted outer electrodes, each uninterrupted outer electrode electrically connecting one of the first chip outer electrode and one of the second chip outer electrodes thereby providing a parallel electrical connection between the first and second chips;
   wherein the multifunctional protective component provides simultaneous protection against current, voltage, and frequency irregularities occurring into the multifunctional protective component through the pair of uninterrupted outer electrodes.

2. The multifunctional protective component according to claim 1 wherein the second chip provides non-linear I-U characteristics, short response time, and an ability to absorb relatively large amounts of energy.

3. The multifunctional protective component according to claim 1 wherein the second chip comprises a multilayer ZnO polycrystalline diode.

4. The multifunctional protective component according to claim 1 wherein the first chip provides a capacitance of up to 100 nF for filtering high frequency disturbances and up to 2000 nF for filtering low frequency disturbances.

5. The multifunctional protective component according to claim 1 wherein the layer of suspension material is comprised of low temperature, high resistance glass.

6. The multifunctional protective component according to claim 1 wherein the layer of suspension material has a thickness of 10 μm to 500 μm.

7. The multifunctional protective component according to claim 1, wherein the first and second chips each have shape and planar dimensions that are substantially the same with respect to one another, and wherein the layer of suspension material is diffused into both the first and second chips to create a mechanical bond therebetween.

8. The multifunctional protective component according to claim 1, wherein the pair of uninterrupted outer electrodes are each comprised of one of Ag and AgPd and are scorched to obtain the parallel electrical connection between the first chip and the second chip.

9. A multifunctional protective component for providing simultaneous protection against current, voltage, and frequency disturbances comprising:

a multilayer self-limiting condensor chip having a first end and a second end, each end having an outer electrode attached thereto;

a multilayer ceramic condenser chip having a first end and a second end, each end having an outer electrode attached thereto;

a layer of nonconductive glass disposed between and connected to the multilayer self-limiting condensor chip and the multilayer ceramic chip; and a pair of uninterrupted outer electrodes, each uninterrupted outer electrode covering and electrically contacting one of the outer electrodes of the multilayer self-limiting condensor chip and one of the outer electrodes of the multilayer ceramic condensor chip outer electrodes;

wherein a parallel electrical connection between the multilayer self-limiting condenser chip and the multilayer ceramic condenser chip is achieved with the pair of uninterrupted outer electrodes, thereby providing protection of current, voltage, and frequency disturbances through the multifunctional protective component.

10. The multifunctional protective component according to claim 9, wherein the multilayer self-limiting condenser chip and the multilayer ceramic condensor chip each have a shape and planar dimensions that are the same with respect to one another, and wherein a layer of nonconductable glass is diffused into both the multilayer self-limiting condenser chip and the multilayer ceramic condenser chip to create a mechanical bond therebetween.

11. The multifunctional protective component according to claim 9, wherein the pair of uninterrupted outer electrodes are each comprised of one of Ag and AgPd and are scorched to obtain the parallel electrical connection between the multilayer self-limiting condenser chip and the multilayer ceramic condenser chip.

* * * * *

UNITED STATES PATENT AND TRADEMARK OFFICE
CERTIFICATE OF CORRECTION

PATENT NO.    : 6,328,176 B1
DATED         : December 11, 2001
INVENTOR(S)   : Zoran Zivic It is certified that error appears in the above-identified patent and that said Letters Patent is hereby corrected as shown below:

Title page,
Item [54], Title, "MULTIFUNTIONAL PROTECTIVE COMPONENT"
and substitute therefor -- SURGE AND NOISE ELIMINATING MULTILAYER CONDENSER AND DIODE --;

Column 3,
Line 58, change

| Chip dimensions (mm) | Un (V()) | α 1-10 mA | $I_{max}$ (8/20 μs) (A) | C (1 kHz) (nF) |
|---|---|---|---|---|
|  | 4 | 32 | 50 | 33 |
| 15 | 29 | 100 | 33 | |
| 3.2 x 2.5 | 22 | 28 | 250 | 47 |
| 27 | 28 | 500 | 1000 | |
| 27 | 27 | 1000 | 680 | |
| 33 | 35 | 2000 | 470 | |
| 5.7 x 5.0 | 35 | 35 | 2000 | 1500 | to

| Chip dimensions (mm) | Un (V()) | α 1-10 mA | $I_{max}$ (8/20 μs) (A) | C (1 kHz) (nF) |
|---|---|---|---|---|
|  | 4 | 32 | 50 | 33 |
| 3.2 x 2.5 | 15 | 29 | 100 | 33 |
|  | 22 | 28 | 250 | 47 |
|  | 27 | 28 | 500 | 1000 |
|  | 27 | 27 | 1000 | 680 |
| 5.7 x 5.0 | 33 | 35 | 2000 | 470 |
|  | 33 | 35 | 2000 | 1500 |

Signed and Sealed this

Thirteenth Day of August, 2002

*Attest:*

*Attesting Officer*

JAMES E. ROGAN
*Director of the United States Patent and Trademark Office*